(12) United States Patent
Dieno et al.

(10) Patent No.: US 6,409,480 B1
(45) Date of Patent: Jun. 25, 2002

(54) DRIVE UNIT FOR HYDRAULIC CONSUMERS FOR INDIVIDUAL STRUCTURAL COMPONENT PARTS OF A MACHINE

(75) Inventors: Kurt Dieno, Rosstal; Andreas Kübel, Lauf; Hans-Jürgen Popp, Gräfenberg; Ernst Würl, Höttingen, all of (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/570,981

(22) Filed: May 15, 2000

(30) Foreign Application Priority Data

May 14, 1999 (DE) .......................................... 199 22 947

(51) Int. Cl.⁷ .............................................. F01B 23/08
(52) U.S. Cl. ...................... 417/321; 417/363; 417/313; 417/372; 417/373; 417/572
(58) Field of Search .................... 417/363, 313, 417/321, 372, 373, 572

(56) References Cited

U.S. PATENT DOCUMENTS

| | | | | |
|---|---|---|---|---|
| 3,644,067 A | * | 2/1972 | Yowell ........................ | 417/370 |
| 3,764,236 A | * | 10/1973 | Carter ......................... | 417/372 |
| 4,547,135 A | * | 10/1985 | Noel et al. ................... | 417/360 |
| 4,614,482 A | * | 9/1986 | Gaffal ......................... | 417/367 |
| 4,780,061 A | * | 10/1988 | Butterworth ................ | 417/371 |
| 5,051,071 A | * | 9/1991 | Haentjens .................... | 415/180 |
| 5,222,874 A | * | 6/1993 | Unnewehr et al. ........... | 417/372 |
| 5,332,371 A | * | 7/1994 | Dantlgraber et al. ........ | 417/363 |
| 5,344,291 A | * | 9/1994 | Antkowiak ................... | 417/359 |
| 5,354,182 A | * | 10/1994 | Niemiec et al. .............. | 417/363 |
| 5,360,322 A | * | 11/1994 | Henein et al. ................ | 417/313 |
| 5,378,121 A | * | 1/1995 | Hackett ........................ | 417/363 |
| 5,897,300 A | * | 4/1999 | Luedtke ........................ | 417/477 |
| 5,911,565 A | * | 6/1999 | Mann et al. .................. | 417/373 |
| 6,048,179 A | | 4/2000 | Forster | |
| 6,062,827 A | * | 5/2000 | Shu .............................. | 417/310 |
| 6,068,455 A | * | 5/2000 | Cowans ....................... | 417/366 |
| 6,142,744 A | * | 11/2000 | Taylor .......................... | 417/53 |

FOREIGN PATENT DOCUMENTS

| | | |
|---|---|---|
| DE | 197 50 379 | 2/1999 |
| DE | 298 18 533 | 3/1999 |

* cited by examiner

*Primary Examiner*—Charles G. Freay
*Assistant Examiner*—William Rodriguez
(74) *Attorney, Agent, or Firm*—Cohen, Pontani, Lieberman & Pavane

(57) ABSTRACT

A drive unit for hydraulic consumers for individual structural component parts of a machine for producing shaped articles from molding materials, including a motor, a pump driven by the motor, and a carrying part configured to connect at least one of the pump and the motor to the machine. The carrying part has a pipe-shaped area which is closed at both ends by at least one of a bottom and a cover. At least the pump projects into the carrying part and is enclosed by the carrying part. The pump is attached to the carrying part on a side facing away from the motor. A portion of the carrying part is constructed as a connection block.

13 Claims, 3 Drawing Sheets

DRIVE UNIT FOR HYDRAULIC CONSUMERS FOR INDIVIDUAL STRUCTURAL COMPONENT PARTS OF A MACHINE

BACKGROUND OF THE INVENTION

1. Field of the Invention

The invention relates to a drive unit for hydraulic consumers for individual structural component parts of a machine, in particular, a plastics injection molding machine, for producing shaped articles out of casting or molding materials, with a pump driven by a motor. The pump and/or the motor are connected to the machine by a carrying part.

2. Discussion of the Prior Art

To an increasing extent, noise is considered to be a nuisance also in working environments. Therefore, it is required that measures be taken to soundproof, as much as possible, drive units for hydraulic consumers that have a pump and a motor.

German reference DE 298 18 533 U1 discloses a drive unit for a hydraulically operated plastics processing machine in which essentially only the pump is surrounded by means of sound encapsulation. For this drive unit, the electric motor and the pump are attached to a motor carrier and the system including the motor pump and motor carrier is mounted in a sound-absorbing manner.

It has been shown that using a soundproofing hood of the above type is not sufficient for effectively reducing sound emission.

A constructional unit with an electric generator and a pump unit is known from German reference DE 197 50 379 A1. Here, the housing of the pump is formed by the walls of the generator housing which form the recess and by a pump cover which closes the recess in the generator housing in a liquid-tight manner and which has a suction connection opening into the recess of the generator housing. At least one directional valve is integrated at least partially in the pump cover and/or one directional valve is mounted on top of the pump cover.

The hydraulic oil taken in by the pump and flowing through the inside of the recesses is used as the coolant for the generator. Overheating of the generator is reliably prevented in this way.

This known constructional unit is driven by an internal combustion engine and is essentially used for operating structural component parts in a motor vehicle.

SUMMARY OF THE INVENTION

It is the object of the present invention to reduce in a particularly efficient manner the sound emissions of a drive unit for hydraulic consumers for individual structural component parts, in particular for a plastics injection molding machine, and, at the same time, to guarantee that the heat generated by the operation of the separate units is carried off in a simple manner.

Pursuant to this object, and others which will become apparent hereafter, one aspect of the present invention resides in a drive unit in which a carrying part that holds the motor and the pump is shaped like a pipe and both ends of the pipe are closed by a bottom and/or a cover. The pump projects into the free space of the pipe-shaped or possibly pot-shaped carrying part and does this in such a manner that it is fastened to the carrying part on the side that faces away from the motor. The area of the carrying part provided for the fastening of the pump is constructed as a connection block. In this way, pipe lines that normally would emit heat and sound are absent from the free space inside the carrying part.

The connection block is connected to a control block. In an advantageous design, the connection block and control block are integrated into the cover or the bottom of the carrying part.

The motor is attached to the side opposite to the pump attachment. The pump and the motor are connected by a rotating control coupling. In an advantageous arrangement, this coupling is designed as a splined profile. For the coupling comprising a male and a female part with a splined profile, the motor shaft is preferably constructed as a hollow shaft.

Accordingly, the pipe-shaped carrying part can be realized in such a way that only the pump is located in a soundproof chamber, or the pump as well as the motor are provided in a chamber, or both the pump and the motor each have their own chamber. If the pump and the motor are separated from one another, an opening is provided in the bottom or the cover of the carrying part. The hollow shaft of the motor enclosing the shaft of the pump is preferably guided through this opening.

The free space in the respective chamber can be filled with a fluid. This fluid can either be permanently enclosed in the chamber or can also be connected via pipe lines to a media cooling and transporting device.

When only one chamber is provided in the pipe-shaped carrying part and the pump and the motor are arranged separately from one another, a seal is provided in the opening of the cover or the bottom.

The carrying part is connected to the machine by rubber-bonded-to-metal members so as to be decoupled with respect to sound. For this purpose, the carrying part can be upright on the machine or can also be suspended from it.

In an advantageous embodiment, shaped elements, for example, fins, are provided for increasing heat dissipation and in order to increase the surface of the carrying housing. When the carrying part is a cast part, the design of the casing can be optimized with regard to the external shape of the pump or the motor as well as with regard to maximizing heat dissipation and minimizing sound emission.

Further, it is especially advantageous that the high-energy low-frequency noise (low notes) are also absorbed effectively when using a cast part due to the existing mass in this case.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
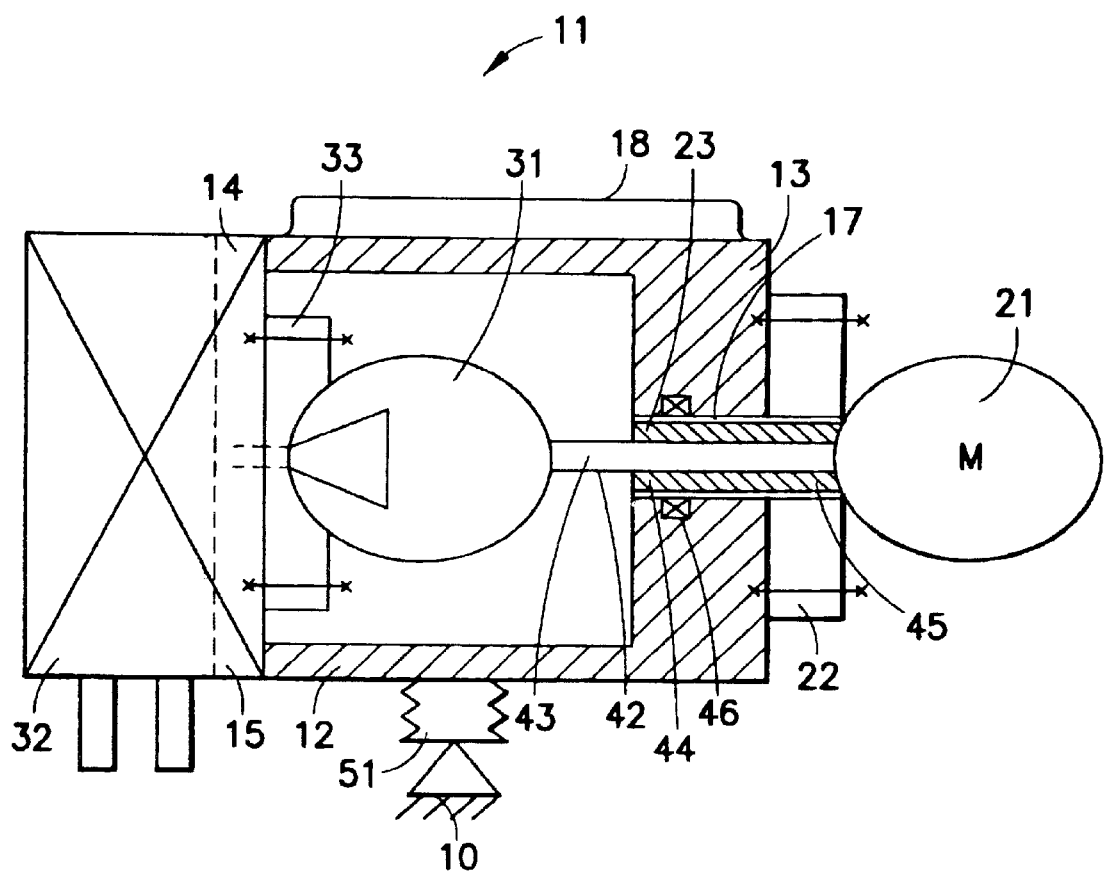
FIG. 1 shows the carrying part with one chamber for the pump.

All three Figures show a carrying part 11 with a pipe-shaped portion 12, closed at both ends by a bottom 13 and/or a cover 14. The drive unit has a motor 21 and a pump 31 connected to it via a coupling 41. Further, the carrying part 11 is attached to a machine 10, not shown in detail, so as to be decoupled with respect to sound via rubber-bonded-to-metal elements 51.

In FIG. 1, the carrying part 11 is pot-shaped and has a bottom 13 that is fixedly connected to the pipe-shaped area 12. The motor 21 is attached by its flange 22 to the outside of the bottom 13. The motor shaft 23 is a hollow shaft 45 and is guided through an opening 17 in the bottom 13. A seal 46 is arranged between the outside of the hollow shaft 45 and the inside wall of the opening 17.

The inside wall of the hollow shaft 45 has a splined profile 44 corresponding to the splined profile 42 of the pump shaft 43.

The pump 31 is connected, via a pump flange 33, with a connection plate 15 and to a control block 32 integrated therewith.

Further, fins 18 are provided on the outer casing of the carrying part 11.

Figure 2:
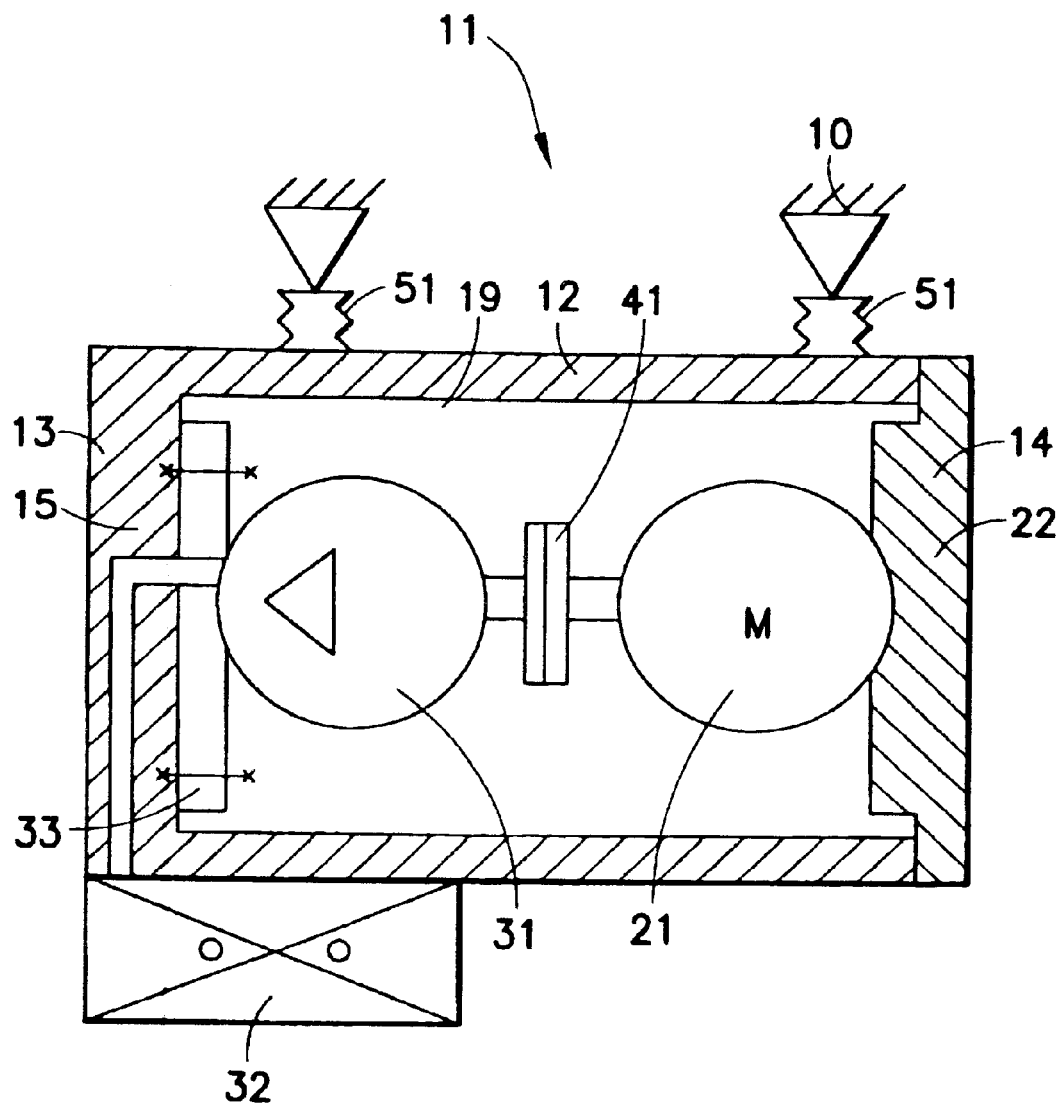
FIG. 2 shows the carrying part with one chamber for the pump and the motor.

In FIG. 2, the carrying part 11 is suspended at the machine 10, not shown in further detail, using rubber-bonded-to-metal members 51.

The carrying part 11 encloses the pump 31 as well as the motor 21 connected to it via a coupling 41. In the present instance, the motor flange 22 is constructed as a cover 14 and is fastened directly to the pipe-shaped area 12 of the carrying part 11.

In FIG. 2, the pump flange 33 is fastened to the bottom 13 of the carrying part, which bottom 13 is formed as the connection block 15. The control block 32 is arranged directly on the connection flange 15 without the use of pipes.

Figure 3:
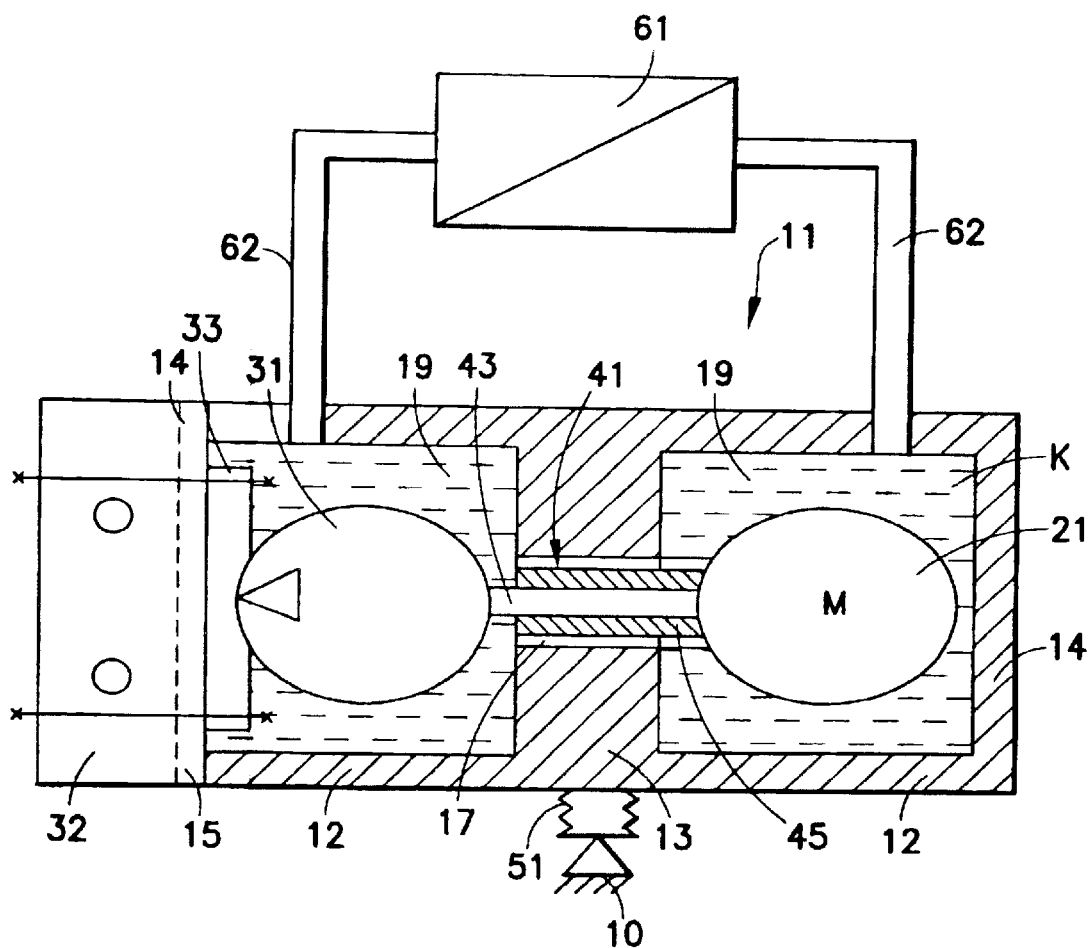
FIG. 3 shows the carrying part with two chambers, one for the pump and one for the motor.

In FIG. 3, the carrying part 11 which is fastened to the machine 10, not shown in further detail, using rubber-bonded-to-metal members 51 has two chambers that are separated by the bottom 13 and are both closed by covers 14. The hollow shaft 45 and the shaft 43 of the coupling 41 are guided through the opening 17 in the bottom 13.

Free spaces 19 of the chambers are filled with a coolant K in the area of the motor 21 as well as in the area of the pump 31. A media cooling and transporting device 61 is connected to the free spaces 19 of the carrying part 11 via pipe lines 62.

The pump flange 33 is constructed so that it not only serves as the cover 14 but also forms a unit with the connection flange 15 and the control block 32.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

We claim:

1. A drive unit for hydraulic consumers for individual structural component parts of a machine for producing shaped articles from molding materials, comprising:

a motor;

a pump driven by the motor; and a carrying part configured to connect at least one of the pump and the motor to the machine, the carrying part having an enclosed pipe-shaped area which is closed at both ends by at least one of a bottom and a cover, at least the pump projecting into the carrying part and being enclosed and surrounded by the carrying part, the pump being attached to the carrying part on a side facing away from the motor, a portion of the carrying part being constructed as a connection block.

2. A drive unit according to claim 1, wherein the one of the bottom and the cover of the carrying part on a side facing away from the pump is constructed as a motor flange.

3. A drive unit according to claim 2, wherein the bottom of the carrying part is connected to the motor and has an opening through which a motor shaft of the motor passes.

4. A drive unit according to claim 1, and further comprising means for coupling the pump and the motor with one another so as to be rigid against rotation.

5. A drive unit according to claim 4, wherein the coupling means includes a splined profile.

6. A drive unit according to claim 5, wherein the coupling means includes a coupling part having a splined profile, the coupling part being a hollow shaft connected to the motor.

7. A drive unit according to claim 1, wherein the carrying part includes rubber-bonded-to-metal members whereby the carrying part is attachable to the machine so as to be isolated with respect to sound.

8. A drive unit according to claim 1, wherein an outer surface of the pipe-shaped area of the carrying part has a shape that permits maximum heat dissipation.

9. A drive unit according to claim 8, wherein the outer surface of the pipe-shaped area has fins.

10. A drive unit according to claim 7, wherein a free space between an outer surface of the at least one of the pump and the motor and an inner surface of the carrying part is filled with a cooling medium.

11. A drive unit according to claim 10, and further comprising means for cooling and transporting the cooling medium, the cooling and transporting means being in fluid connection with the carrying part via pipe lines.

12. A drive unit according to claim 1, wherein the carrying part has a pot shape that is closeable by the cover, at least the pump being arranged in a free space of the carrying part so as to be detachably connected to the bottom of the pot shaped part.

13. A drive unit according to claim 12, wherein the carrying part is made of a cast material.

* * * * *